Figure 1:
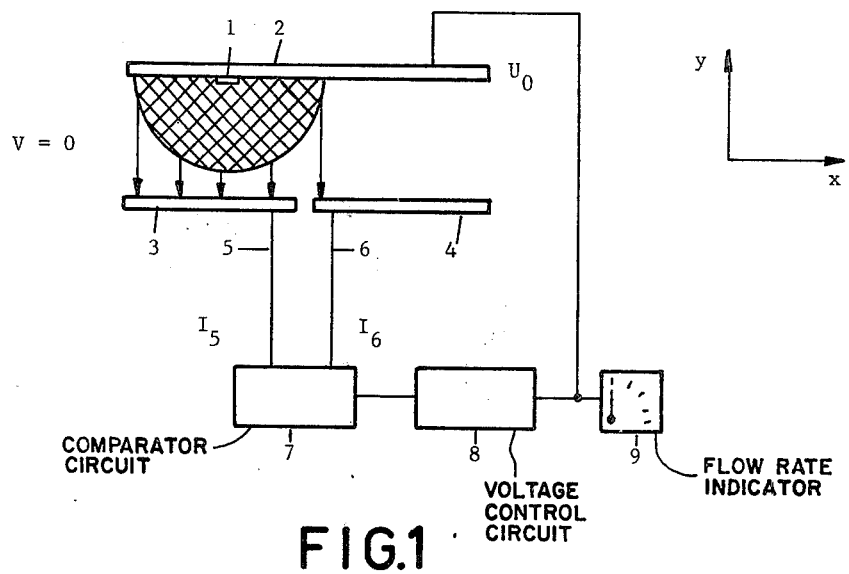

United States Patent [19]

Janka

[11] 4,193,296
[45] Mar. 18, 1980

[54] METHOD AND AN INSTRUMENT FOR THE MEASUREMENT OF THE FLOW RATE OF GASES BASED ON IONIZATION

[75] Inventor: Kauko Janka, Tampere, Finland
[73] Assignee: Wallac Oy, Finland
[21] Appl. No.: 929,236
[22] Filed: Jul. 31, 1978
[30] Foreign Application Priority Data
  Aug. 1, 1977 [FI] Finland .................................. 772326
[51] Int. Cl.$^2$ .............................................. G01F 1/56
[52] U.S. Cl. ................................................. 73/194 F
[58] Field of Search ..................................... 73/194 F
[56] References Cited
  U.S. PATENT DOCUMENTS
  2,861,452 11/1958 Morgan .................................. 73/194

3,470,741 10/1969 Durbin .................................. 73/194

FOREIGN PATENT DOCUMENTS
  2725960 12/1978 Fed. Rep. of Germany ............ 73/194

Primary Examiner—Herbert Goldstein
Attorney, Agent, or Firm—Fisher, Christen & Sabol

[57] ABSTRACT

A method and apparatus for measuring the flow rate of gases comprises the placing of a small radioactive source material in the path of the gas flow, establishing an electrical potential between one electrode and two other electrodes disposed transversely of the gas flow path from the first electrode and in the direction of gas flow from each other, and comparing the currents generated between the electrodes as a function of the rate of gas flow.

7 Claims, 2 Drawing Figures

METHOD AND AN INSTRUMENT FOR THE MEASUREMENT OF THE FLOW RATE OF GASES BASED ON IONIZATION

The invention pertains to a method and an instrument for the measurement of the flow rate of gases, both of which are particularly suitable for the measurement of low gas velocities.

There are a number of methods and instruments for the measurement of the flow rate of gases which are based on the ionization of gases. In a method based on the loss of ions ions are produced in the gas at a constant rate and carried to the ion meter along with the gas flow. The slower the flow rate of the gas, the greater is the number of ions that are lost, for example through recombination. This indicates a decrease in the ion current and can be detected by means of an ion meter. This method has certain drawbacks: the errors caused by impurities in the gas, the problem of standardization of the ion production, and the very high quality and therefore very costly measuring instruments required to detect small numbers of ions.

With those instruments that are based on the time of flight of ions, short ion pulses are produced and the time of flight of these ion clouds over a certain distance, which is dependent on the flow rate of the gas, is measured. The instruments used in this method are electronically complex, and at small flow rates the measurement results are inaccurate due to the spreading of the ion clouds.

There are several measurement methods which are based on the change in the path of the ions caused by the flow of gas. These include a method in which part of the ion current created between the electrodes of the measurement capacitor is carried, along with the gas flow, outside the capacitor, when the ion current arriving at one of the capacitor's electrodes is proportional to the rate of the gas flow in a certain ratio. However, impurities in the gas reduce the accuracy of the measurements made with this method.

In yet another method the ions are divided, in an electric field, between the two halves of the electrode in proportion to the velocity of the gas. This ratio is then measured and expressed as the flow rate (see Finnish Patent Application No. 761675). The meter reading is not linear with respect to the flow rate. In addition, this method places certain demands on the source of ions used.

The aim of the present invention is to achieve a method and an instrument for the measurement of the flow rate of gases which would supercede, in respect of both simplicity and accuracy, all previous methods and devices based on the ionization of gases. The invention makes it possible to obtain very accurate measurements even in the region of very low gas velocities for which no reliable, compact, and moderately priced meter is available at present.

Figure 2:
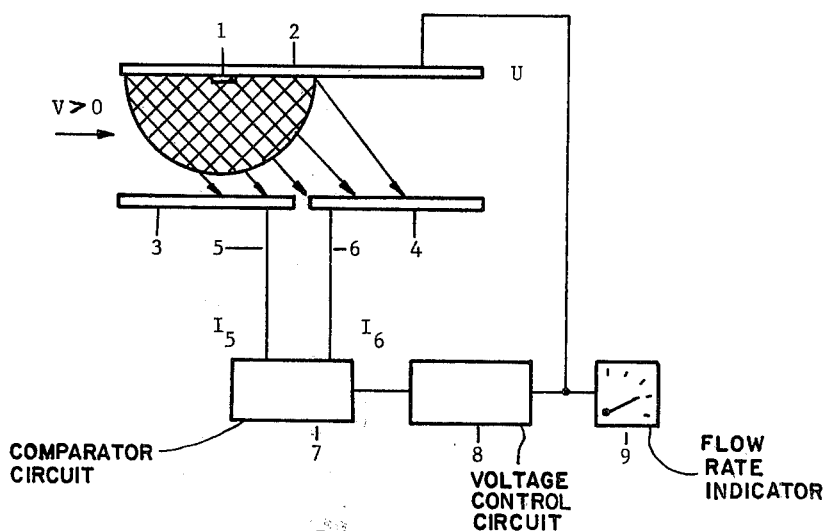

In the drawings FIG. 1 illustrates diagrammatically a prefered form of apparatus according to the invention when the gase flow V equals O, and; FIG. 2 illustrates schematically the ion current flow when gase is flowing toward the right.

The invention is presented in more detail by the following example which is represented by FIGS. 1 and 2. The operation of the instrument with the velocity at 0 is shown in FIG. 1; the operation of the instrument with the velocity set at any value within the measurement range of the instrument is shown in FIG. 2.

In the diagram number (1) denotes the ion source, for example a small radioactive sample; (2) is the electrode whose voltage is regulated; numbers (3) and (4) the electrodes which measure the ion currents; (5) and (6) are the electric leads: the comparator circuit for measuring the ion currents is denoted by (7); number (8) represents the control circuit, and number (9) the flow rate indicator attached to it.

The instrument described in the example operates on the following principle: with the velocity at zero the ions produced by the ion source (1) are carried, due to the effect of the minimum voltage $U_o$ between the electrodes, directly towards the electrodes in a direction colinear with the electric field, when the unequal currents $I_5$ and $I_6$ are carried in leads (5) and (6). Under the control of the comparator circuit (7) the control circuit (8) tends to reduce the voltage between the electrodes which thus remains at its minimum value.

FIG. 2 shows a situation where the velocity is other than zero. The gas flow indicated by the horizontal arrow at the left in the FIG. tends to alter the path of the ions which causes an increase in current $I_6$ compared with current $I_5$. Thus the voltage of control circuit (8) increases under the control of the comparator circuit (7), so that the currents $I_5$ and $I_6$ are in a certain ratio to each other (for example they are kept equal in size).

In the following the interdependence of the set voltage and the flow rate is examined in a coplanar electrode construction represented by the example. The following symbols are used in this examination:

$V_x$ = gas velocity = the velocity component of the ions caused by the gas flow $U$ = voltage between electrode 1 and electrodes 2 and 3

$E$ = electric field between electrode 1 and electrodes 2 and 3

$V_y$ = ion velocity component caused by the electric field $E$ $d$ = distance between electrode 1 and electrodes 2 and 3

$k$ = ion mobility

If a constant current is assumed we obtain the following equations:

$$V_x = dx/dt$$

$$V_y = dy/dt = kE = k(U/d),$$

from whence $$dy/dx = k(Ud)/v_x$$

Since the comparative and control circuits keep the path of the ions fixed we obtain:

$$dy/dx = kU/d/V_x = \text{constant} = A.$$

so that $U = V_x dA/k$.

The interdependence of voltage U and the flow rate of the gas is therefore linear, which is an advantage.

Thus it is not necessary to measure the currents $I_5$ and $I_6$ accurately within a wide range, but it will be sufficient if it is possible to compare their magnitude in relation to each other within a narrow range. For this reason it becomes possible to use a very small radioactive source for ionization so that the use of the instrument does not require special permits and it need not be marked with a label indicating the presence of radioactivity, and it will still be possible to manufacture the instrument at a reasonable price.

If the comparator (7) is constructed to keep the ion currents constant (for example equal in size), the effect on the measurement results of aerosol particles present in the gas will be almost completely eliminated.

REFERENCE:

M. Lehtimäki, K. Janka, E. Mäkinen, H. Salmi and G. Graeffe: Air velocity measurements by the ionization method. Tampere University of Technology, Department of Electrical Engineering Physics, research report No. 26-1977, Tempere Finland 1977.

I claim:

1. Method of measuring the flow rate of a gas stream, comprising the steps of:

placing a source of ionization in said gas stream;

placing first, second and third electrodes in the stream of gas ionized by said source, the second and third electrodes being spaced from each other in the direction of flow and both being spaced from the first electrode in a direction transverse to said flow;

establishing a first electrical potential between the first and second electrodes and a second electrical potential between the first and third electrodes to generate first and second electrical currents in said stream of ionized gas;

adjusting the first and second electrical potentials to obtain first and second electrical currents of predetermined relative value;

the flow rate being a function of the ratio between said first and second potentials.

2. Method of claim 1, wherein said ion source is a radioactive material.

3. Method of claim 2, wherein said electrical potentials are adjusted to obtain electrical currents of equal value.

4. Apparatus for measuring the flow rate of a gas stream comprising;

a source of ionization positioned in said gas stream;

first, second and third electrodes positioned in the stream of gas ionized by said source, the second and third electrodes being spaced from each other in the direction of flow and both being spaced from the first electrode in a direction transverse to said flow;

electrical circuit means to establish a first electrical potential between the first and second electrodes and a second electrical potential between the first and third electrodes to generate first and second electrical currents in said stream of ionized gas;

means for adjusting the first and second electrical potentials to obtain a predetermined ratio between the values of the first and second currents, the flow rate being a function of the ratio between the adjusted electrical potentials.

5. Apparatus of claim 4, wherein said source of ionization is a radioactive substance.

6. Apparatus of claim 4 or 5, wherein said circuit means included comparator circuit means for adjusting said potentials.

7. Apparatus of claim 6, wherein said circuit means includes electrical flow rate indicator means.

* * * * *